United States Patent [19]
Nishio et al.

[11] Patent Number: 5,262,814
[45] Date of Patent: Nov. 16, 1993

[54] MOUNTING APPARATUS FOR WINDOW IN BACK COVER OF CAMERA

[75] Inventors: Etsuro Nishio; Taminori Odano, both of Tokyo, Japan

[73] Assignee: Asahi Kogaku Kogyo Kabushiki Kaisha, Tokyo, Japan

[21] Appl. No.: 945,258

[22] Filed: Sep. 15, 1992

[30] Foreign Application Priority Data

Sep. 17, 1991 [JP] Japan .................... 3-82220

[51] Int. Cl.⁵ .................................. G03B 17/02
[52] U.S. Cl. ............................ 354/288; 354/202
[58] Field of Search .................. 354/202, 288, 64

[56] References Cited

U.S. PATENT DOCUMENTS

| | | | |
|---|---|---|---|
| 3,339,472 | 9/1967 | Leitz | 354/202 |
| 3,523,496 | 8/1970 | Nerwin | 354/288 |
| 3,848,984 | 11/1974 | Kanno | 354/288 X |
| 3,956,759 | 5/1976 | Karikawa | 354/150 |
| 4,208,118 | 6/1980 | Urano et al. | 354/288 |
| 4,244,591 | 1/1981 | Umetsu | 354/64 X |
| 4,384,780 | 5/1983 | Bresson | 354/288 |
| 4,469,423 | 9/1984 | Bresson | 354/288 |
| 4,692,005 | 9/1987 | Takami | 354/21 |
| 5,142,316 | 8/1992 | Tanii et al. | 354/288 X |

FOREIGN PATENT DOCUMENTS

| | | | |
|---|---|---|---|
| 63-88538 | 4/1988 | Japan | 354/64 |
| 63-101834 | 5/1988 | Japan | 354/64 |

Primary Examiner—Michael L. Gellner
Assistant Examiner—J. K. Han
Attorney, Agent, or Firm—Sandler Greenblum & Bernstein

[57] ABSTRACT

A camera including a transparent window member having a window portion set in a opening (window) in a back cover of the camera and a peripheral flange surrounding the window portion to be adhered to an inner surface of the back cover. The camera also includes a light intercepting member which bridges the inner surface of the back cover and the peripheral flange adhered to the inner surface of the back cover. The light intercepting member has an opening larger than the opening of the back cover.

13 Claims, 2 Drawing Sheets

MOUNTING APPARATUS FOR WINDOW IN BACK COVER OF CAMERA

BACKGROUND OF THE INVENTION

1. Field of the Invention

The present invention relates to a camera having a patrone chamber in which a patrone is accommodated, and a back cover which encloses the patrone chamber. More precisely, the invention relates to a mounting apparatus of a DX code viewing window in such a camera.

2. Description of Related Art

Most of the recent 35 mm films (i.e., patrones) bear standardized DX codes which can be viewed through a DX code viewing window provided on the back cover of a camera. The data (i.e., DX Code) indicated on a display panel located on a peripheral surface of the film patrone is visible through the window when the patrone is loaded in the camera. The DX code viewing window is usually provided with a transparent member made of synthetic resin or the like, adhered thereto, to prevent dust or water, etc., from entering the camera.

SUMMARY OF THE INVENTION

The primary object of the present invention is to provide a camera in which the transparent window member is easily secured to the DX code viewing window.

To achieve the object mentioned above, according to the present invention, there is provided a camera including a transparent window member having a window portion set in an opening (window) in a back cover of the camera and a peripheral flange surrounding the window portion to be adhered to an inner surface of the back cover. The camera also has a light intercepting member which bridges the inner surface of the back cover and the peripheral flange adhered to the inner surface of the back cover, the light intercepting member having an opening larger than the opening of the back cover.

With this arrangement, when adhesive is applied to the connecting surfaces of the transparent window member and the back cover, any excess adhesive that might exude from the connecting surfaces, upon attachment of the surfaces, will be hidden by the light intercepting member, thereby maintaining a good appearance of the camera. This also contributes to a simplification of the adhering process, resulting in an improved operational efficiency thereof.

Preferably, the light intercepting member includes an annular connecting portion which bridges the back cover and the flange of the transparent window member, and an opening corresponding to the window portion of the transparent window member, so that the inner surface of the light intercepting member can be brought into contact with the patrone.

It is possible to provide a flange adhering surface, to which the flange of the transparent window member is adhered, on the inner surface of the back cover corresponding to the peripheral edge of the DX code viewing window.

Preferably, the annular connecting portion of the light intercepting member bridges the positioning projection and the abutting projection to enclose a gap therebetween, and bridges the peripheral edge portion of the transparent window member and the inner surface of the back cover, to enclose a gap therebetween.

The present disclosure relates to subject matter contained in Japanese utility model application No. 3-82220 (filed on Sep. 17, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
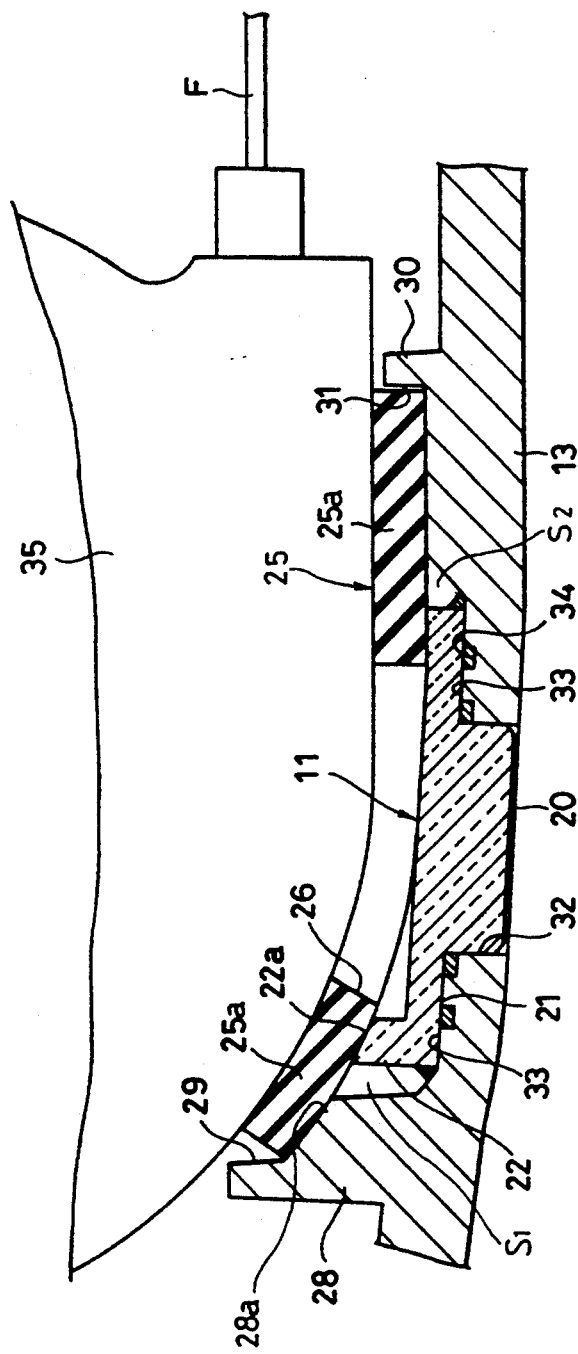
FIG. 1 is an enlarged sectional view of a back cover opening of a camera and surrounding elements thereof, according to the present invention.

In FIG. 1, a back cover 13 of a camera has a DX code viewing window (confirming window) 32 formed therein. The back cover 13 is provided, on the inner surface thereof, defining the peripheral edge of the DX code viewing window 32, with a flange adhering surface 33, to which a peripheral flange 21 of a transparent window member 11 is to be adhered. The back cover 13 also has a first positioning projection 28, having a positioning surface 29, for positioning a light intercepting member 25, and a second positioning projection 30, having a positioning surface 31, located outside of the flange adhering surface 33, which is also for positioning the light intercepting member 25.

The flange adhering surface 33 has a plurality of connecting grooves 34 in which an adhesive is applied. The position of the DX code viewing window 32 corresponds to a patrone chamber in which a patrone 35 is loaded. Consequently, the positioning projection 28 projects toward the patrone chamber and has a height greater than that of the inner surface of the remaining portion of the back cover 13. The positioning projection 28 is shaped so that the light intercepting member 25 will conform to the shape of the patrone 35. In FIG. 1, "F" designates the film.

Figure 2:
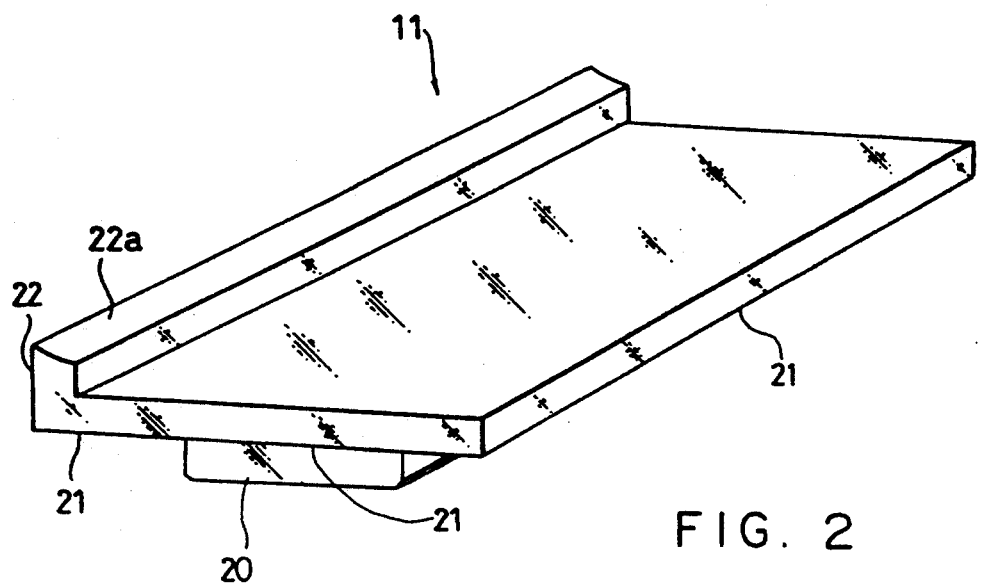
FIG. 2 is a perspective view of a transparent window member, according to the present invention.
Figure 3:
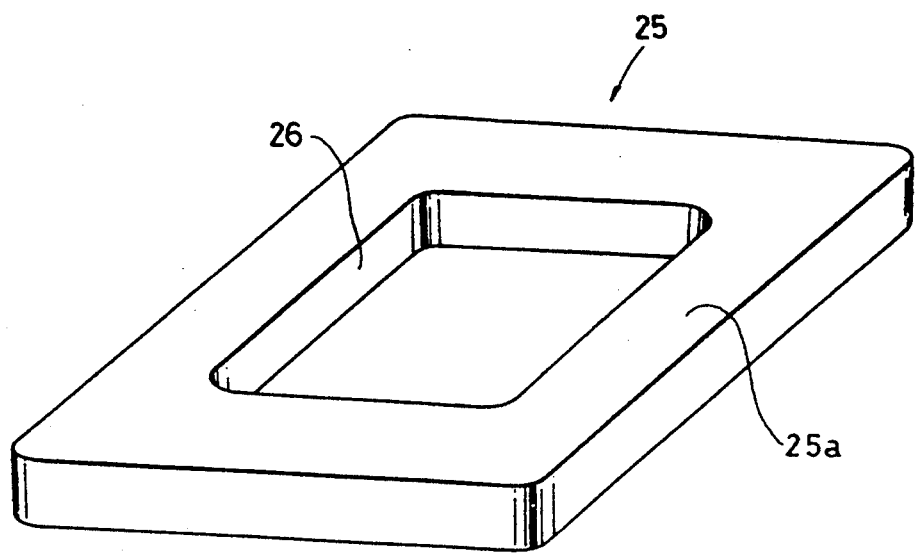
FIG. 3 is a perspective view of a light intercepting member, according to the present invention.

The transparent window member 11 is provided with peripheral flange 21, a window portion 20, and an abutting projection 22, as shown in FIG. 2. Flange 21 is adhered to the flange adhering surface 33, provided on the peripheral edge of the DX code viewing window 32, of the back cover 13. Window portion 20 is fitted in the DX code viewing window 32, from inside of the back cover 13, and serves as a positioning means when the transparent window member 11 is mounted. The abutting projection 22 projects toward the patrone chamber from one end (left end in FIGS. 1 and 2) of the peripheral flange 21 and has a height greater than that of the inner surface of the back cover 13. The abutting projection 22 has a curved upper surface 22a corresponding to the curved outer surface of the light intercepting member 25.

The generally rectangular light intercepting member 25 is made of a soft or flexible material, such as synthetic resin, through which little or no light is transmitted, and is provided with a center opening 26 corresponding to the DX code viewing window 32, and an annular connecting portion 25a. The center opening 26 is larger than the DX code viewing window 32.

Annular connecting portion 25a bridges the upper surface 28a of the positioning projection 28 and the upper surface 22a of the abutting projection 22 to enclose a gap $S_1$ between the positioning projection 28 and the abutting projection 22. Annular connecting portion 25a also bridges the peripheral edge of the transparent window member 11 and the inner surface of the back cover 13, to enclose a gap $S_2$ therebetween. Accordingly, light incident upon the window portion 20 is prevented from entering the patrone chamber. Furthermore, a good appearance of the camera is maintained.

In a camera as constructed above, the transparent window member 11 is mounted to the camera as follows.

First, the adhesive grooves 34 surrounding the DX code viewing window 32 are filled with adhesive while the back cover 13 is in an open position. Thereafter, the window portion 20 is fitted into the DX code viewing window 32 to depress the transparent window member 11 against the back cover 13, while positioning the transparent window member 11 in the left and right directions. As a result, the peripheral flange 21, of the transparent window member 11, is firmly adhered to the adhering surface 33 of the back cover 13 by the adhesive in grooves 34. After the lapse of a predetermined period of time, the transparent window member 11 will be completely adhered to the back cover 13.

Thereafter, the connecting portion 25a of the light intercepting member 25 is placed inside of the back cover 13 to bridge the upper surface 28a of the positioning projection 28 and the upper surface 22a of the positioning projection 22, and to bridge the flange 21 and the inner surface of the back cover 13, wherein the window opening 26 is made larger than the DX code viewing window 32. The light intercepting member 25 is adhered to the upper surfaces 22a and 28a of the positioning projections 22 and 28, the peripheral surface of the transparent window member 11, and the inner surface of the back cover 13, by an adhesive.

When the back cover 13 is closed, the inner surface of the connecting portion 25a of the light intercepting member 25 comes into contact with the patrone 35. Accordingly, light transmitted through the window portion 20 does not enter the patrone chamber. The flange 21 closely adheres to the inner surface of the back cover 13 by way of the adhesive. If the adhesive slightly overflows from the connecting surfaces, the excess adhesive is hidden by the light intercepting member 25, which bridges the inner surface of the back cover 13 and the flange 21, resulting in a good appearance on the inside of the back cover.

Although the above discussion has been applied to a conventional camera in the illustrated embodiment, the present invention can be applied to any type of camera including a waterproof or water-resistant camera which can be used in the rain, for example.

As can be understood from the above discussion, according to the present invention, when the light intercepting member is adhered to the flange and the inner surface of the back cover, excess adhesive that has exuded out from between the surfaces of the flange and the back cover when these surfaces are adhered, will not be visible. Consequently, troublesome operations, such as grinding of the peripheral edge of the flange after the removal of the mold gate, etc., to obtain a good appearance, is not necessary. Hence the operational efficiency is increased. Furthermore, expensive equipment, such as an ultrasonic welding machine is not necessary, resulting in a reduction of the manufacturing cost.

Although the invention has been described with reference to particular means, materials and embodiments, it is to be understood that the invention is not limited to the particulars disclosed and extends to all equivalents within the scope of the claims.

We claim:

1. A camera comprising;
   a transparent window member having a window portion set in an opening in a back cover of the camera and a peripheral flange surrounding said window portion to be adhered to an inner surface of the back cover; and,
   a light intercepting member which bridges the inner surface of said back cover and said peripheral flange adhered to the inner surface of the back cover, said light intercepting member having an opening larger than said opening of the back cover.

2. A camera according to claim 1, further comprising a patrone chamber which receives therein a patrone, wherein said back cover covers said patrone chamber.

3. A camera according to claim 2, wherein the opening of said back cover is a DX code viewing window.

4. A camera according to claim 3, wherein said window portion of the said transparent window member is fitted in said DX code viewing window to serve as a positioning means of said transparent window member when said transparent window member is mounted to the camera.

5. A camera according to claim 4, wherein said light intercepting member comprises an annular connecting portion which bridges said back cover and said flange of said transparent window member, and an opening corresponding to said window portion of said transparent window member, such that the inner surface of said light intercepting member can be closely connected to the patrone.

6. A camera according to claim 5, wherein said light intercepting member is made of a rectangular soft flexible material through which little or no light is transmitted.

7. A camera according to claim 4, wherein the back cover is provided on the inner surface thereof corresponding to said peripheral edge of the DX code viewing window, with a flange adhering surface to which said flange of said transparent window member is adhered.

8. A camera according to claim 7, wherein said back cover comprises a positioning projection, outside said flange adhering surface, with a positioning surface for positioning the light intercepting member.

9. A camera according to claim 8, wherein said flange adhering surface is provided thereon with a plurality of adhesive grooves, which receive therein an adhesive.

10. A camera according to claim 8, wherein said positioning projection projects toward said patrone chamber at a greater degree than the inner surface of said back cover, so that said light intercepting member will conform to the shape of the patrone within said patrone chamber.

11. A camera according to claim 10, wherein said transparent window member is provided on the flange thereof with an abutting projection which projects toward said patrone chamber to a greater degree than the inner surface of said back cover when the transparent window member is mounted to the camera.

12. A camera according to claim 11, wherein said abutting projection has an upper end surface curved to come into close contact with said curved outer surface of the light intercepting member.

13. A camera according to claim 11, wherein said light intercepting member bridges not only the positioning projection and the abutting projection to enclose a gap therebetween, but also said peripheral edge portion of the transparent window member and said inner surface of the back cover to enclose a gap therebetween.

* * * * *

UNITED STATES PATENT AND TRADEMARK OFFICE
CERTIFICATE OF CORRECTION

PATENT NO. : 5,262,814
DATED : November 16, 1993
INVENTOR(S) : E. NISHIO et al.

It is certified that error appears in the above-indentified patent and that said Letters Patent is hereby corrected as shown below:

Cover page, item [57],
    line 2 of the abstract, change "a" to ---an---.

At column 4, line 26 (claim 4, line 2) of the printed patent, delete "the" after "portion of".

Signed and Sealed this

Third Day of December, 1996

Attest:

BRUCE LEHMAN

*Attesting Officer*    *Commissioner of Patents and Trademarks*